United States Patent
Cohrs et al.

[19]

[11] Patent Number: 5,960,393
[45] Date of Patent: Sep. 28, 1999

[54] USER SELECTABLE MULTIPLE THRESHOLD CRITERIA FOR VOICE RECOGNITION

[75] Inventors: Paul Wesley Cohrs; Mitra P. Deldar, both of Indianapolis, Ind.; Donald Marion Keen; Ellen Anne Keen, both of Ocean, N.J.

[73] Assignee: Lucent Technologies Inc., Murray Hill, N.J.

[21] Appl. No.: 08/873,613

[22] Filed: Jun. 12, 1997

Related U.S. Application Data

[63] Continuation-in-part of application No. 08/509,681, Jul. 31, 1995, abandoned.

[51] Int. Cl.$^6$ .................................................. G10L 5/06
[52] U.S. Cl. ............................................ 704/240; 704/275
[58] Field of Search ........................ 704/200, 236–240, 704/231, 246, 270, 275, 251, 233, 247, 250, 252

[56] References Cited

U.S. PATENT DOCUMENTS

| | | | |
|---|---|---|---|
| 4,297,528 | 10/1981 | Beno | 395/2.53 |
| 4,752,958 | 6/1988 | Cavazza et al. | 395/2.57 |
| 4,870,686 | 9/1989 | Gerson et al. | 395/2.43 |
| 4,984,177 | 1/1991 | Rondel et al. | 395/2.86 |
| 5,027,406 | 6/1991 | Roberts et al. | 395/2.53 |
| 5,127,043 | 6/1992 | Hunt et al. | 379/88 |
| 5,187,735 | 2/1993 | Herrero Garcia et al. | 379/88 |
| 5,199,077 | 3/1993 | Wilcox et al. | 704/256 |
| 5,365,574 | 11/1994 | Hunt et al. | 379/88.02 |
| 5,679,001 | 10/1997 | Russel et al. | 434/185 |
| 5,684,924 | 11/1997 | Stanley et al. | 704/233 |
| 5,737,724 | 4/1998 | Atal et al. | 704/251 |
| 5,842,161 | 11/1998 | Cohrs et al. | 704/251 |

OTHER PUBLICATIONS

Carol Tough, "The Design or an Intelligent Transparent Speech Interface," IEE Colloquium on Systems and Applications of Man–Machine Interaction Using Speech I/O (London), 1991.

Robert S. Van Peursem, "Do's and Don'ts of Interactive Voice Dialog Design," Speechtech '85, 1985.

D. Bigorne, A., Cozannet, M. Guyomard, G. Mercier, L. Miclet, M. Querre, and J. Siroux, "A Versatile Speaker–Dependent Continuous Speech Understanding System," 1988 Int. Conf. Acoust., Speech, and Sig. Proc., ICASSP–88 (New York, NY) Apr. 11–14, 1988.

*Primary Examiner*—David R. Hudspeth
*Assistant Examiner*—Donald L. Storm
*Attorney, Agent, or Firm*—Brian K. Dinicola; Samuel R. Williamson

[57] ABSTRACT

A method and apparatus for speech recognition in which a single criterion or set of criteria is selected manually by the user, from plural classes of recognition criteria. The stored classes of recognition criteria include a default class optimized for an average user in normal conditions, at least one class having a probability of recognition greater than said default class, and at least one class having a probability of recognition less than said default class. Accordingly, the user may select that class of criteria which provides the best results for him or her, as measured by greater accuracy (fewer false positive detections) or fewer instances of non-rejection. An utterance is compared to one or more models of speech to determine a similarity metric for each such comparison. The model of speech which most closely matches the utterance is determined based on the one or more similarity metrics. The similarity metric corresponding to the most closely matching model of speech is analyzed to determine whether the similarity metric satisfies the criteria of the user-selected class. The present application has application to many problems in speech recognition including isolated word recognition and command spotting. Illustrative embodiments of the invention in the context of telecommunications instruments are provided.

22 Claims, 11 Drawing Sheets

USER SELECTABLE MULTIPLE THRESHOLD CRITERIA FOR VOICE RECOGNITION

RELATED APPLICATIONS

This application is a continuation-in-part of application Ser. No. 08/509,681 filed on Jul. 31, 1995, which application is now abandoned.

BACKGROUND OF THE INVENTION

1. Field of the Invention

The present invention relates to the field of speech recognition and, more particularly, to the detection of commands in continuous speech.

2. Description of the Background Art

Command spotting systems, which are responsive to human voice, are highly desirable for a wide variety of consumer products. In a telecommunications instrument, for example, typical operations such as on/off, transmit/receive, volume, push-button dialing, speech recognizer training, and telephone answering device functions may be readily achieved by monitoring an audio input channel and taking appropriate action whenever a specific utterance (the command) appears in the input. For each command to be recognized by the system, a statistical model such as, for example, a template or hidden Markov model (HMM) well known in the art, is maintained. The statistical model defines the likelihood that a given segment of input contains a command utterance.

During its operation, a conventional command spotting system continually generates conjectures or hypotheses about the identities and locations of command words in the currently observed input. Each hypothesis is tested against a respective command model and a score is generated for its respective likelihood. The score may be determined by, for example, conventional Viterbi scoring. If the score exceeds a threshold. T, the hypothesis is considered as accepted and the action associated with it is effected. Otherwise, the hypothesis is rejected. The probability distribution of the score of either a correct or a false hypothesis depends on a variety of factors, including the speaker, the transducer, and the acoustical environment. A fixed threshold T is usually set sufficiently high to ensure, for the maximum number of users, an acceptably low false alarm rate over the whole range of expected operating conditions. Unfortunately, due to wide variations in user voice characteristics and environmental conditions, the selected threshold typically functions much better for some users than others.

Users having a low probability of exceeding the threshold may, on a regular basis, be ignored by the system. One technique for addressing the problem of frequently rejected users is directed to reducing the threshold level. Setting the threshold too low, however, typically results in an unacceptably high number of false positive hypotheses for average users.

SUMMARY OF THE INVENTION

According to the present invention, the above-mentioned deficiencies of the prior art are avoided by a variable criteria speech recognition technique suitable for, among other applications, command spotting and isolated word spotting.

A recognition criterion or set of recognition criteria are selected manually (by the user), from among plural recognition criteria or sets of recognition criteria. An utterance is compared to one or more models of speech to determine a similarity metric for each such comparison. The model of speech which most closely matches the utterance is determined based on the one or more similarity metrics. The similarity metric corresponding to the most closely matching model of speech is analyzed to determine whether the similarity metric satisfies the selected set of recognition criteria.

Some of the recognition criteria serve to increase the threshold of recognition while others serve to decrease the threshold of recognition. In accordance with an illustrative embodiment of the present invention, users of a device employing the inventive speech recognition system and method are provided with the ability to select a set of recognition criteria that is to be applied to voice utterances. Illustratively, the selecting means may comprise a feature option or a switch setting. Selection of a recognition criteria set may be performed on a per user basis, a per command basis, a per command family basis, or a combination thereof.

The various features of novelty which characterize the invention are pointed out with particularity in the claims annexed to and forming a part of the disclosure. For a better understanding of the invention, its operating advantages, and specific objects attained by its use, reference should be had to the accompanying drawings and descriptive matter in which there are illustrated and described several embodiments of the invention.

BRIEF DESCRIPTION OF THE DRAWINGS

The features and advantages of the present invention will be more readily understood from the following detailed description when read in conjunction with the accompanying drawings, in which;

FIGS. 4 through 11 show flow charts for some of the training procedures performed by the circuitry of FIG. 1 in accordance with the present invention.

DETAILED DESCRIPTION OF THE INVENTION

For clarity of explanation, the illustrative embodiment of the present invention is presented as comprising individual functional blocks (including functional blocks labeled as "processors"). The functions represented by these blocks may be implemented trough the use of either shared or dedicated hardware including, but not limited to, hardware capable of executing software. Illustratively, the functions of the processors presented in FIG. 1 may be implemented by a single shared processor such as, for example, a digital signal processor (DSP). It should be noted, however, that as utilized herein, the term "processor" is not intended to refer exclusively to hardware capable of executing software.

Figure 1:
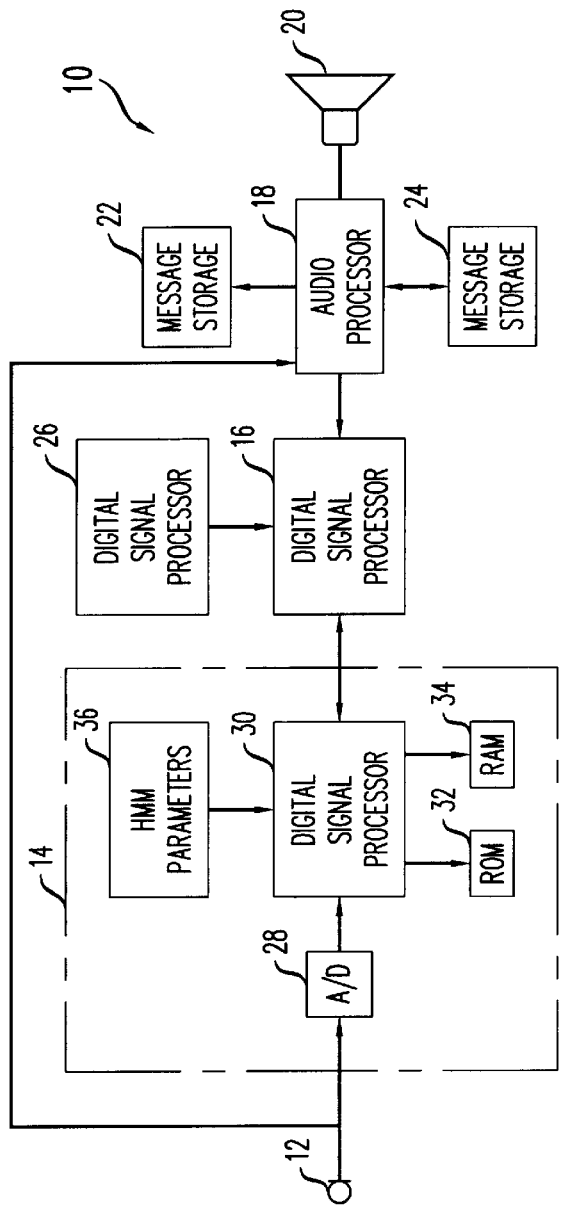
FIG. 1 is a block diagram of an illustrative device configured to utilize user-selectable, multiple criteria speech recognition in accordance with the present invention.

FIG. 1 presents an illustrative embodiment of the present invention which concerns a telephone answering device employing speech recognition. It is also contemplated, however, that the teachings of the present invention are equally applicable to any device in which a voice-operated control interface is desired. For example, the use of selectable multiple-threshold criteria for voice recognition in accordance with the present invention may be easily extended to the control of conventional home and business telephones, cordless and cellular telephones, personal data organizers, facsimile machines, computers (such as personal computers) and computer terminals.

In any event, and as shown in FIG. 1, device 10 includes a microphone 12 for receiving input speech from the user, a speech recognition system 14, and a device control processor 16 for directing the operation of the various functioning components of the device 10. In the illustrative embodiment, device 10 is configured as an answering machine such as is provided in a digital answering system available from Lucent Technologies as Model No. 1340 or, alternatively, as is described in U.S. Pat. No. 5,481,596. The components in device 10 include an audio processor 18, a speaker 20, a message storage unit 22, and a line interface 24 for receiving and sending audio signals from and to a calling party via a telephone line (not shown).

Audio processor 18 is conventional in the art and performs various functions under the control of the device control processor 16. For example, audio processor 18 receives audio input signals from microphone 12 and line interface 24. Each of these signals is processed as required by any specific telephone system requirements and stored in message storage 22 in an appropriated format, which format may be analog or digital. Processor 18 further directs audio output signals representing, for example, outgoing messages or messages received from a calling party, to line interface 24 or loudspeaker 20, respectively. Furthermore, audio processor 18 encodes messages such as, for example, voice prompts received from the device control processor 16, into audio signals and sends them to speaker 20.

The device control processor 16 may also be of conventional design. As indicated above, processor 16 controls telephone call processing and the general operation of answering machine device 10. Device control processor 16 receives input from and issues control instructions to speech recognition system 14 and the audio processor 18. Processor 16 also receives input from a criteria selection switch 26. In a manner which will be explained in more detail later, criteria selection switch 26 permits the user to select from among multiple recognition criteria to improve the performance of speech recognition system 14. In response to the input of a user-selection, the device control processor 16 changes the mode of operation of the speech recognition system 14 by sending appropriate instructions, as explained below.

With continued reference to FIG. 1, it can be seen that speech recognition system 14 comprises a conventional analog-to-digital (A/D) converter 28 to convert the audio signal picked up by the microphone 12 into a stream of digital samples; a digital signal processor 30 such as the AT&T DSP 16A, which processes digital signal samples generated by A/D converter 28; a ROM 32, which contains program instructions executed by the digital signal processor 30 (See FIG. 2); a RAM 34, in which temporary computation results are stored; and an HMM parameter memory 36 which is a non-volatile memory such as, for example, a EEPROM, ROM, flash RAM, battery backed RAM, etc. and which, in the illustrative embodiment, contains at least two sets of parameters of hidden Markov models (HMM) for the phrases to be recognized. As will be readily appreciated by those skilled in the art, one or more of devices 28, 30, 32, 34, and 36 may be physically located on the same electronic chip.

Speech recognition system 14 is placed in command spotting mode by a signal from processor 16 indicating that no device control operation initiated by a user is currently pending. In this mode, the system 14 checks each incoming speech utterance from A/D converter 28 for the presence of a command phrase for which one or more HMMs are stored in the HMM parameter memory 36. In other words, in command spotting mode, recognizer 14 employs HMMs in memory 36 which correspond to command phrases such as, for example, "message playback", "record outgoing message", "next message", "rewind", and so on. It will, or course, be readily appreciated by those skilled in the art that HMMs are merely illustrative of the models which may be employed and that any suitable model may be utilized. An utterance from the user is accepted as a command if the presence of such a command phrase is confirmed by the system 14. Otherwise, the utterance is rejected. If the hypothesis is accepted, a signal indicating that a specific command phrase has been detected is sent from speech recognizer 14 to the device control processor 16. Device control processor 16 then initiates the operation associated with the command. If the utterance is rejected, no message is sent to the device control processor 16. The operation of processor 16 in response to accepted commands is conventional within the art With reference now to FIG. 2, there is shown a block flow diagram of the processing performed by the digital signal processor 30 of the speech recognition system 14. Each block represents a distinct processing function which is typically implemented as a subroutine of the program stored in ROM 32. The four basic steps involved in the recognition of speech are: feature extraction, time registration, pattern similarity measurement, and decision strategy. Current speech recognition systems use a variety of techniques to perform these basic steps. Each approach has its own performance and cost mix. The typical speech recognition strategy is to "scan" the incoming speech data continuously, perform dynamic programming, compute a similarity measure or "distance" between the utterance spoken and the stored reference patterns, and decide if the similarity measure is sufficiently close to an anticipated value to declare that the utterance is recognized.

Figure 2:
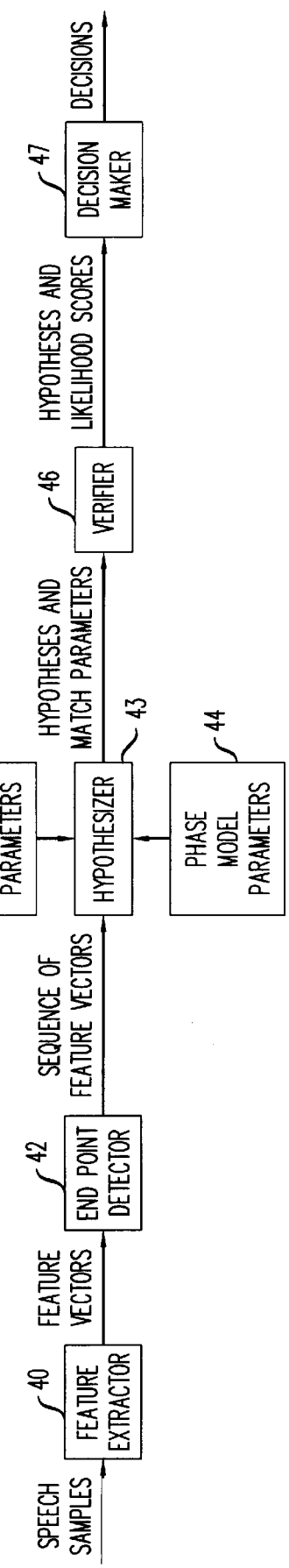
FIG. 2 depicts a block flow diagram depicting the performance of speech recognition to provide a control interface for the illustrative device of FIG. 1.

With continued reference to FIG. 2, it will be observed that the speech samples provided by A/D converter 28 are processed by conventional speech extractor 40 to produce a stream of vectors of speech features, typically at a rate of 100 to 200 vectors/second. A variety of signal processing techniques exist for representing a speech signal in terms of time varying parameters which are useful for speech recognition. Examples of suitable signal processing transformations are the direct spectral measurement (mediated either by a bank of bandpass filters or by a discrete Fourier transform), the cepstrum, and a set of suitable parameters of a linear predictive model (LPC) (See J. D. Markel and A. H. Gray, Jr., "Linear Prediction of Speech", Springer-Verlag, New York, (1976)). In the illustrative embodiment of FIG. 2, each vector contains 10 to 30 components of speech features relating to speech energy, delta speech energy, cepstrum coefficients, and delta cepstrum coefficients. The stream of feature vectors is processed by conventional endpoint detector 42 which detector determines the beginning and end points of utterances embedded in the speech. The output of the endpoint detector comprises finite sequences of speech vectors, where each sequence of vectors corresponds to a single utterance.

After feature extraction/end point detection, the next basic recognition step is the computation of a similarity measure between a stored reference and the time-normalized parameters extracted from the utterance. To this end, a comparator module or hypothesizer 43 receives the speech vector sequences output by endpoint detector 42 and generates a hypothesis as to their verbal contents. In so doing, the hypothesizer 43 uses HMM models for the phrases, the parameters of which are stored as indicated by phrase model parameters block 44 and HMM background models, the parameters of which are stored as indicated by background model parameters block 45. The term "background" refers to silence, noise, or any speech which is not one of the command phrases. Physically, all of these models are located in the HMM parameters memory 36 of FIG. 1.

Hypothesizer 43 makes two types of hypotheses. The first type of hypothesis (referred to as a "background hypothesis") assumes that the feature vector sequence includes only the background. The second type of hypothesis (referred to as a "phrase hypothesis") assumes that the feature sequence includes a command word, possibly followed or preceded by background. For each of these two hypothesis, the hypothesizer applies a conventional dynamic programming optimization procedure, such as Viterbi decoding (or scoring), which procedure determines the most likely hypothesis of that type and a corresponding numerical value (or score) of the estimated likelihood of the hypothesis.

In addition, the dynamic programming procedure produces some additional parameters for the phrase hypothesis, which parameters are referred to as "match parameters". A first match parameter is generated by forming the difference between an expected phrase duration for the most likely phrase hypothesis and the phrase duration determined by the hypothesizer for the utterance corresponding to the most likely phrase hypothesis. A second match parameter is generated by forming the mean of the absolute value of the difference between expected HMM state durations of the most likely phrase hypothesis and the state durations determined by the hypothesizer 43. A third match parameter is generated by forming the difference between the likelihood scores for a first best candidate and a second best candidate for the received utterance. As will be readily ascertained by those skilled in the art, data for use in generating match parameters is available as part of conventional speech recognition processes employing, for example, HMMs and Viterbi scoring.

A similarity metric is generated by the hypothesizer 43, in accordance with the present invention. This similarity metric is defined as a combination of the distances for each of selected parameters from recognition target ranges determined by behavioral experimentation and a received utterance. The recognition target ranges, determined by the experimentation, are based upon the overall recognition goal for any particular application. This similarity metric is illustratively provided at the output of hypothesizer 43, and includes: 1) the most likely phrase hypothesis; 2) a corresponding numerical value or score, which is the difference between the logarithms of the phrase hypothesis likelihood estimate and the background hypothesis likelihood estimate; and 3) the match parameters. The verifier 46 receives the output of the hypothesizer 43 and checks if each of the match parameters is within a corresponding prescribed range. The verifier checks whether the first match parameter is within, for example, the range −½ to 1. Verifier 46 checks whether the second match parameter is, for example, within a range of 100 ms. Verifier 46 also checks whether the score for the second best candidate considered in the third match parameter is within 10% of the score of the first best candidate. (Any of these ranges may be varied to suit particular operating environments). If the match parameter is within the prescribed ranges, the verifier passes the hypothesis and its respective scores to the decision maker 47. Otherwise, the hypothesis is rejected.

The decision maker 47 decides whether to accept or reject the most likely phrase hypothesis. If the hypothesis is accepted by the decision maker 47, the hypothesis is reported to the device control processor 16 of FIG. 1. The method by which the decision maker 47 makes its decision is explained in the block flow diagram of FIG. 3.

Figure 3:
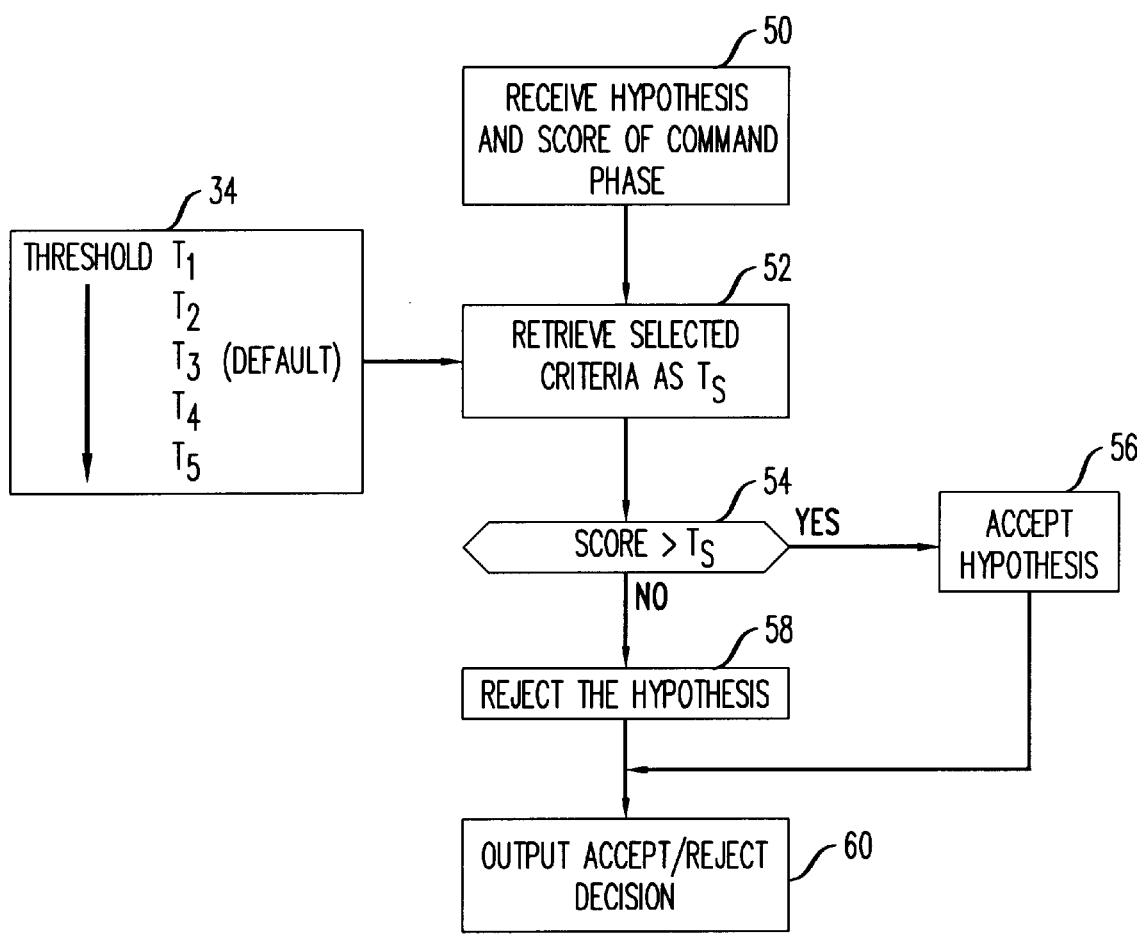
FIG. 3 shows a block flow diagram depicting the process by which a set of criteria are manually selected by the user in accordance with one embodiment of the present invention.

The flow diagram of FIG. 3 begins in step 50 where the hypothesized phrase and its corresponding score are received. In accordance with a simplified embodiment of the present invention, control is directed to block 52 wherein threshold T is set to one of a plurality of stored classes of recognition criteria or fixed values T1, T2, T3, T4, or T5 stored in memory, which may be RAM 34 or ROM 32. T3 is an optimized or default value selected, in a conventional manner, to work well for an "average" user in normal conditions. Such optimized value is derived, without undue experimentation, from empirical results obtainable by one skilled in the art of voice recognition techniques. The values of T2 and T1 are selected to obtain an increased likelihood of positive recognition (e.g., 20% and 40% higher probability, respectively, relative to the default setting) at the potential expense of an increase in the number of false positive alarms, while the values of T4 and T5 are selected to obtain a decreased probability of positive recognition (e.g., −15% and −30%, respectively, relative to the default setting) at the potential expense of an increase in missed commands. The value corresponding to the selected recognition criterion is set to $T_s$ and compared to the obtained hypothesis score (block 54). If the score exceeds $T_s$, the hypothesis is accepted (block 56). If the score is below $T_s$, the hypothesis is rejected (block 58). As indicated at block 60, the accept/reject decision is then output for use by the device control processor 16 in a conventional manner.

In a more sophisticated embodiment of the present invention, a set of thresholds or criteria sets are selected by a user from a plurality of criteria sets. This set of thresholds is retrieved during the operation denoted by block 52. With each set of criteria, it becomes more or less likely, in comparison to a default set of criteria, that a command will be recognized, depending upon the particular set selected. In this regard, it will be noted that HMM word recognition is achieved by computing the likelihood of producing an unknown input word pattern with each of the stored word models, with the input word being recognized as that model which produces the greatest likelihood. The accuracy of the model is influenced by such criteria as the location of the utterance endpoints, duration of the utterance, and the number of frames in each state. In a conventional manner, each of these criteria may be individually adjusted, in accordance with the selection input by the user, so as to achieve an increased likelihood of recognition, at the expense of more frequent false positive results for the "average user" or a decreased likelihood or recognition, with greater accuracy for fewer users. A default value for each criterion, optimized in a conventional manner to provide the best empirical results for the average user under "normal" environmental conditions, may be utilized in the absence of an input user selection.

By way of additional example, in which telecommunications device 10 is configured as cordless telephone, speech recognition system 14 may be switched from the command spotting mode into a dialing mode by a signal from device control processor 16 indicating that the user has initiated a dialing procedure. This dialing procedure might have been initiated by pressing either a keypad button or by saying a command phrase (e.g., "dial") which invokes the dialing operation. In this mode, recognizer 14 uses HMMs of name phrases (instead of command phrases as in the command spotting mode described above), where each name phrase is associated with a corresponding telephone number. Such name phrase HMMs and associated telephone numbers are stored in memory 34. If an utterance of a name phrase is accepted by recognizer 14, a message indicating the recognition of a name phrase has been accepted is sent to device control processor 16. Device control processor 16 then dials the telephone number associated with the recognized name phrase and notifies the user that the name has been recognized correctly. If, however, the speech recognizer 14 rejects an utterance, it nevertheless sends a message to the device control processor 16, indicating that an utterance has been rejected. The device control microprocessor then prompts the user to repeat the utterance. The notification and prompting are typically done by a distinctive tone followed by the audible reproduction of an appropriate voice message.

Referring next to FIGS. 4 through 11, there is shown flow charts for some of the training procedures performed by the circuitry of FIG. 1. The manner in which these procedures are performed is indicated by these flow charts, shown in sufficient detail to permit one skilled in the art to duplicate the circuitry of FIG. 1 and by programming a microprocessor or by special purpose logic circuitry. Whereas the flow charts show procedures for training the voice recognition system 14 by setting voice commands and for customizing levels of sensitivities for its operation, it is readily apparent that it will be a simple matter to modify these training procedures for any other application.

Figure 4:
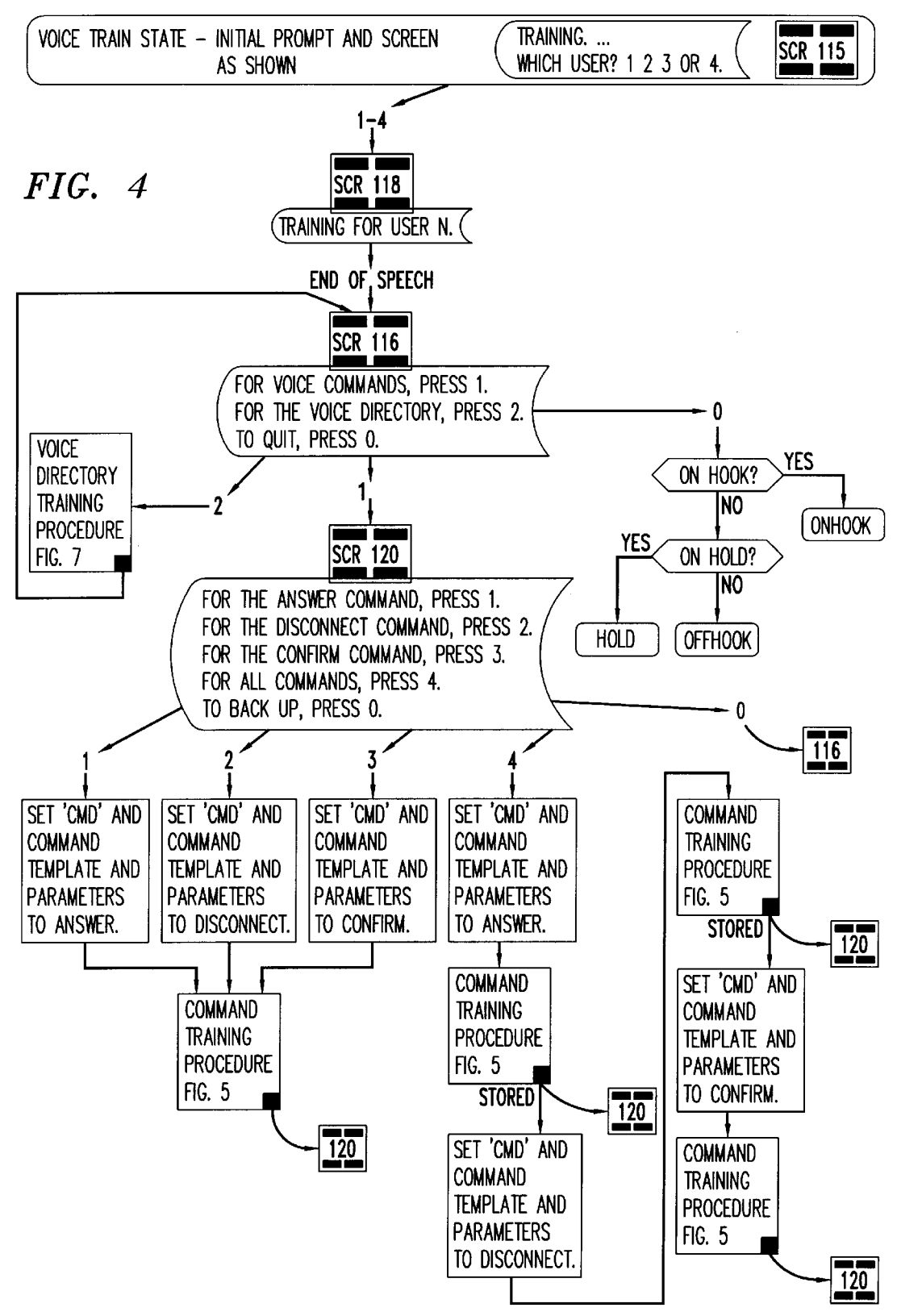
Figure 5:
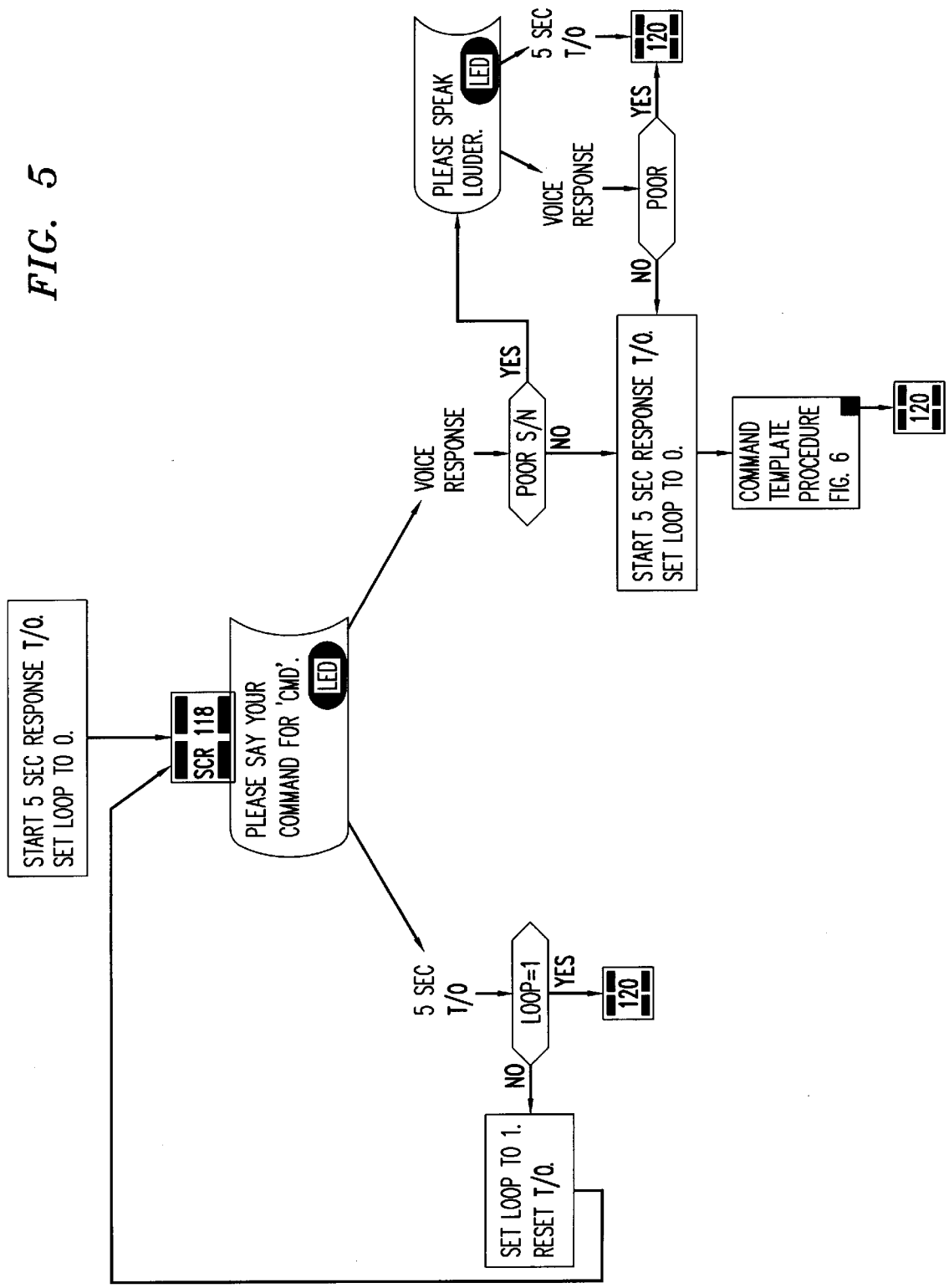
Figure 6:
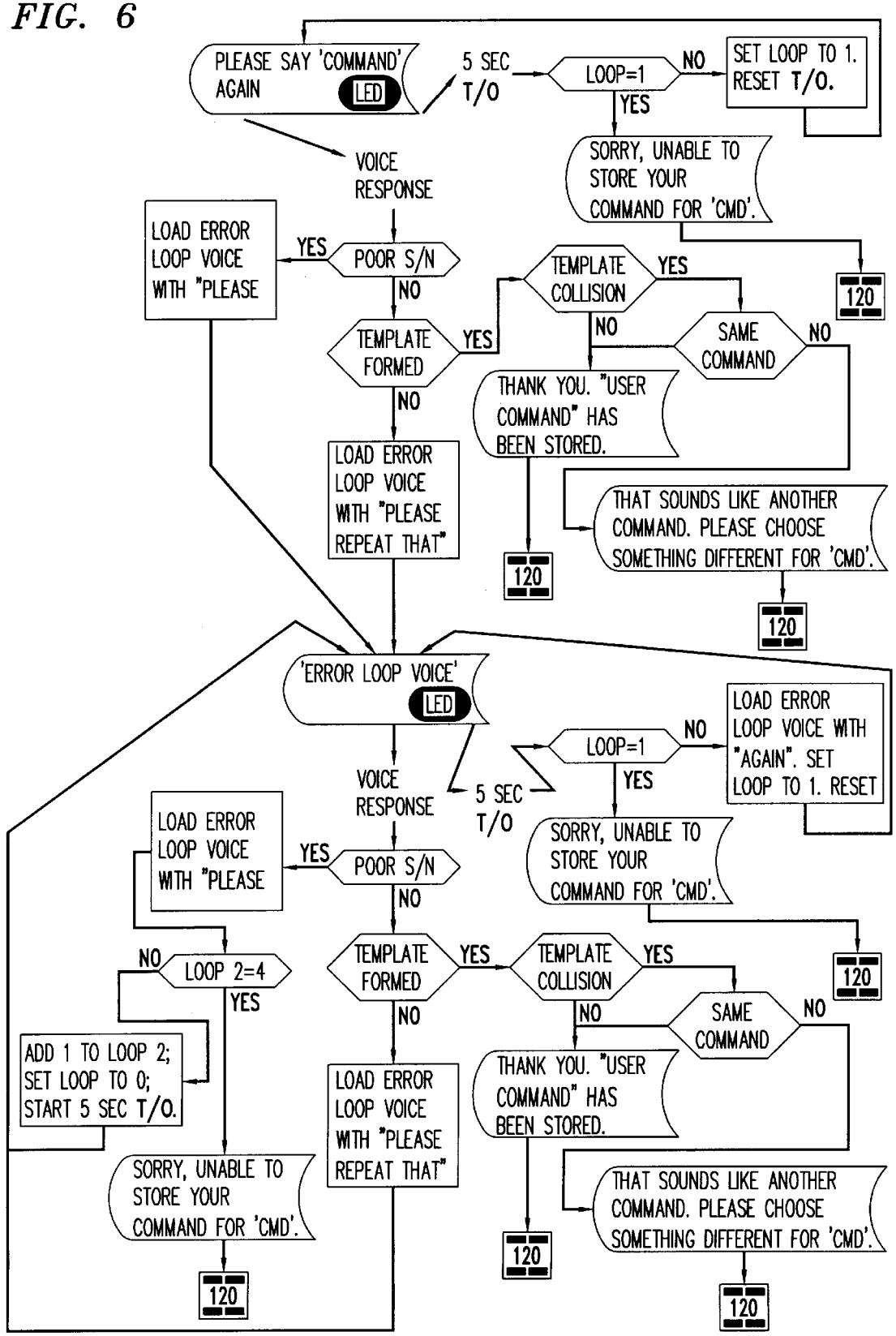
Figure 12:
FIG. 12 shows a telephone device in which the present invention may be employed.

Referring specifically to FIGS. 4, 5, and 6, in combination, there is shown a training procedure for entering voice recognition commands for a telephone device 10, such device illustratively being shown in FIG. 12. To enter the training procedure, a user presses a voice button 71 on the telephone device 10 and selects training in a display 72 or from a voice menu provided in the telephone device. As illustrated in FIGS. 4 through 6, the voice recognition commands are illustratively, answer, disconnect, and confirm, although it is understood that additional commands may be made available to a user. Any word or group of words may be selected by the users for the answer and disconnect command. Also, as illustrated, such command training is for four users, although more or fewer users easily may be accommodated.

Figure 7:
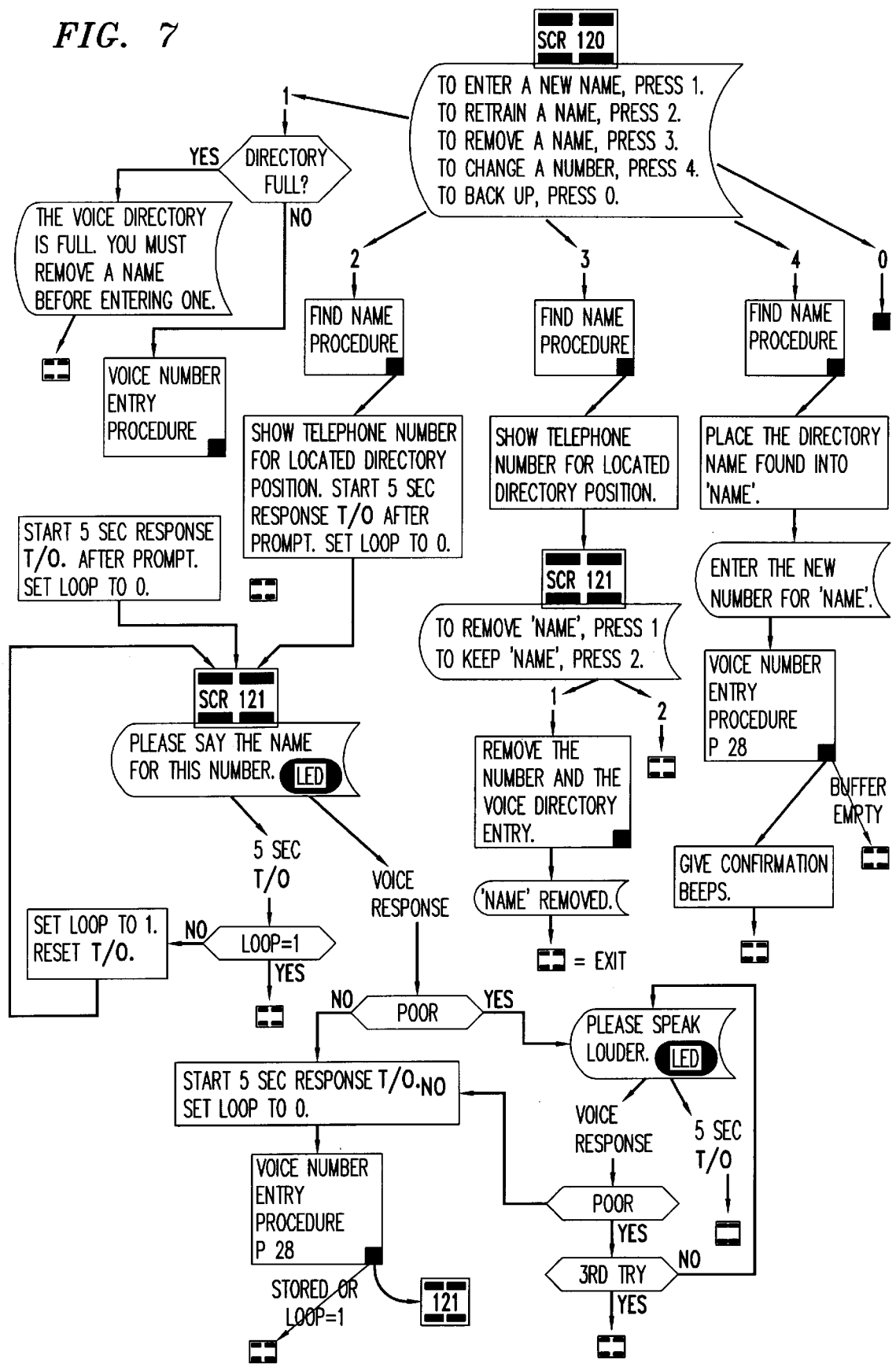
Figure 8:
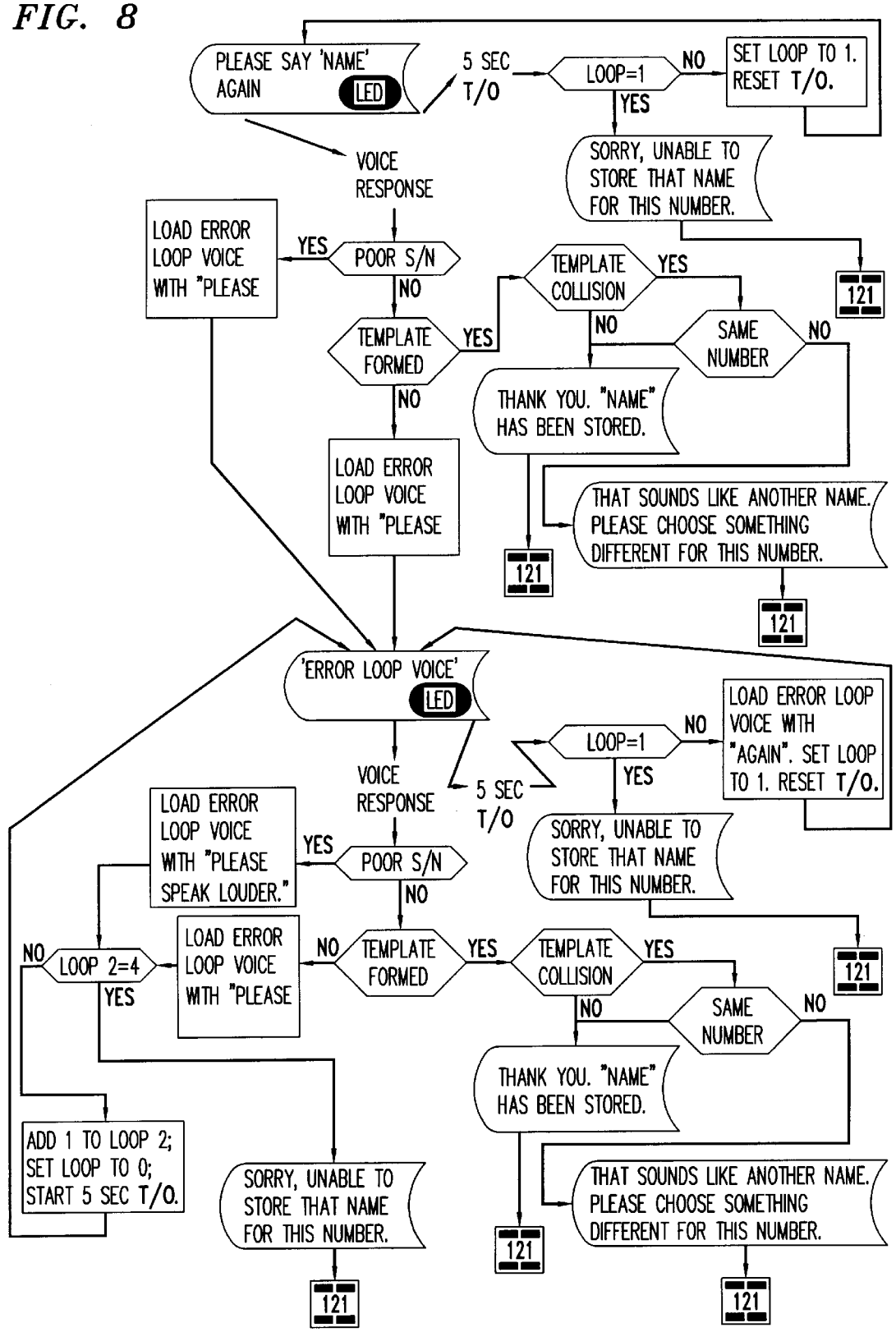

A voice directory training procedure is shown in FIGS. 7 and 8 for entering voice recognition names into a voice directory for voice dialing. The voice directory includes names and associated numbers for voice dialing accessed through use of a dialing name. The voice directory training procedure is accessed through the process shown in FIG. 4, with a user specifically selecting this procedure through prompts provided on the telephone device 10 shown in FIG. 12.

Figure 9:
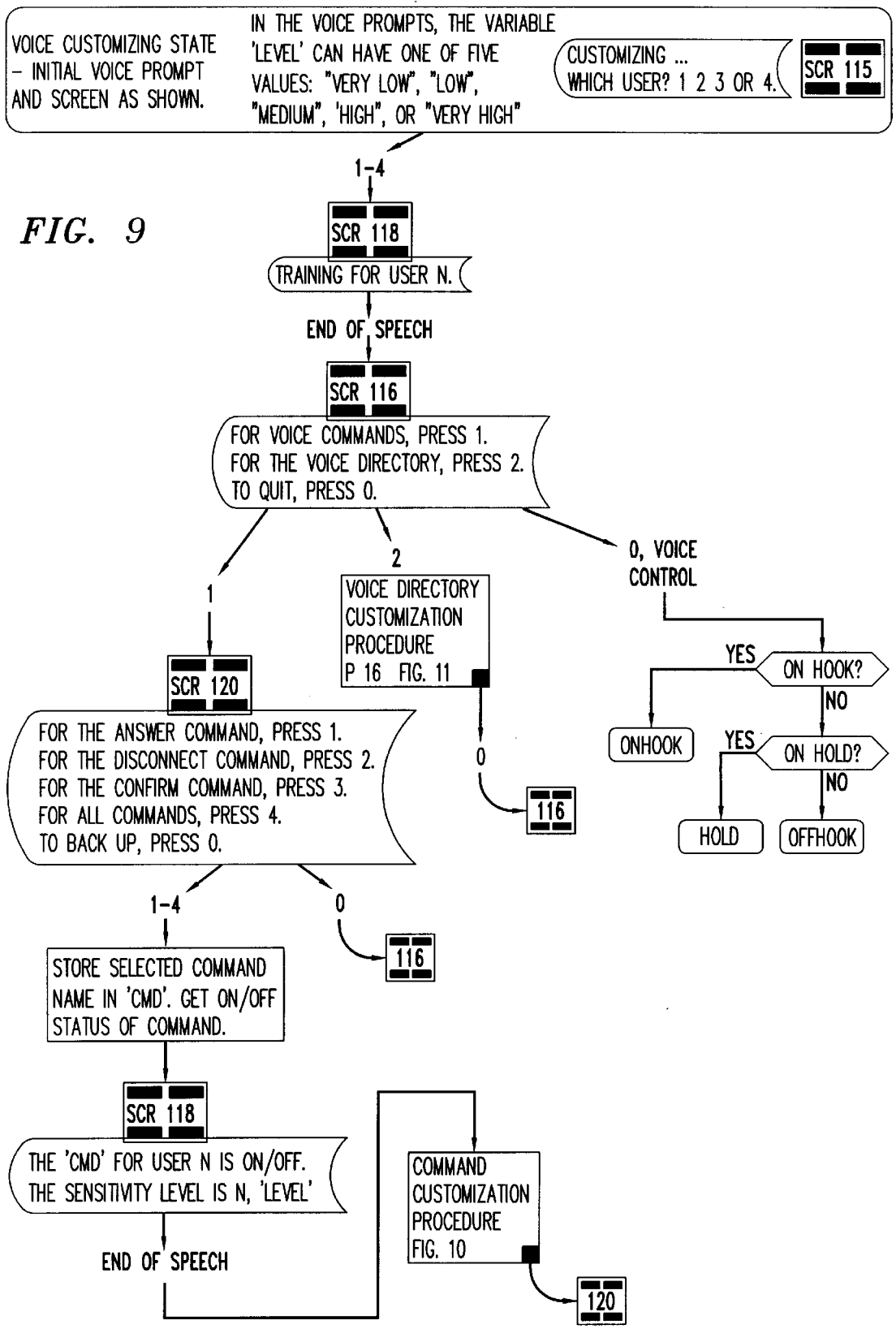
Figure 10:
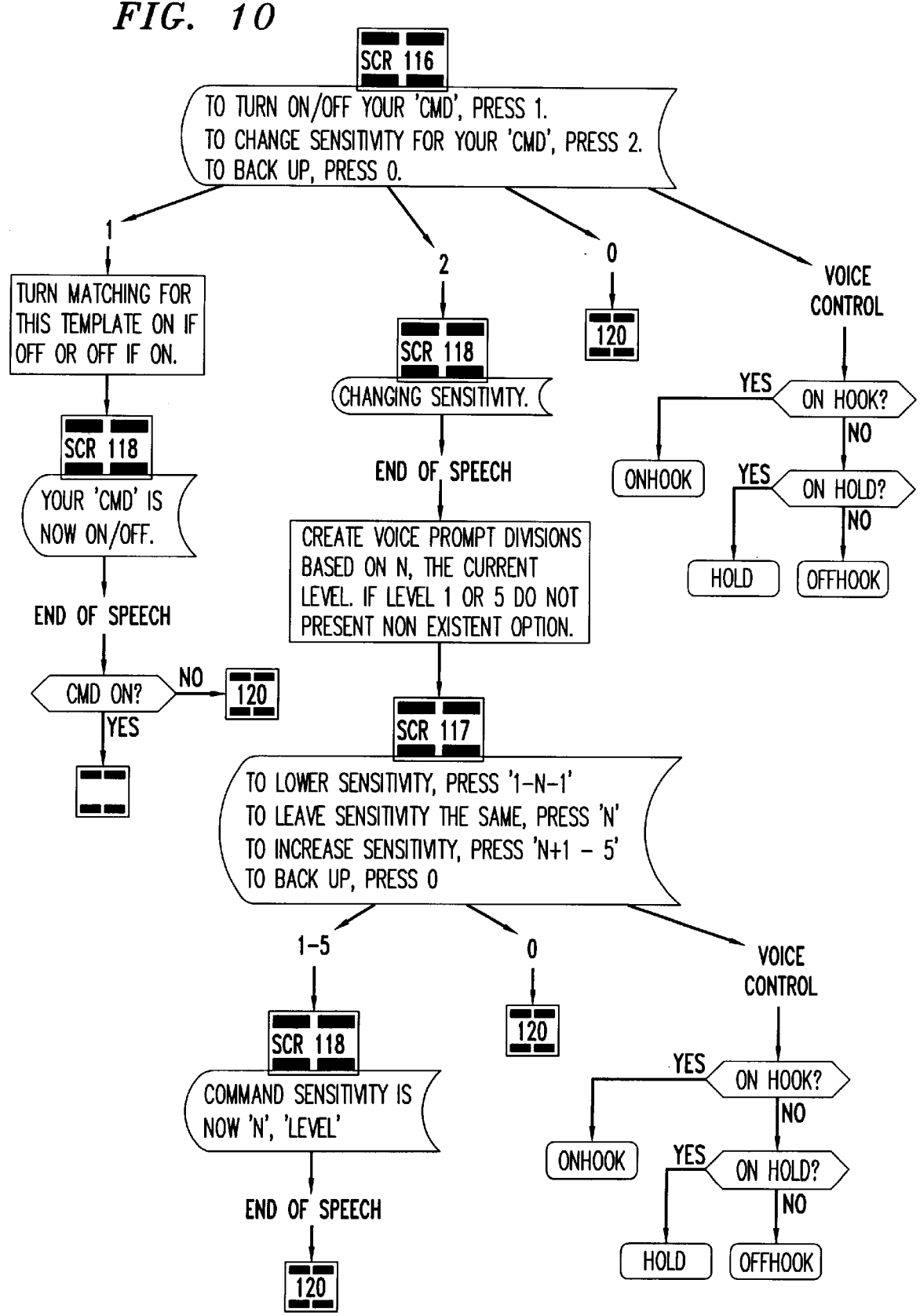
Figure 11:
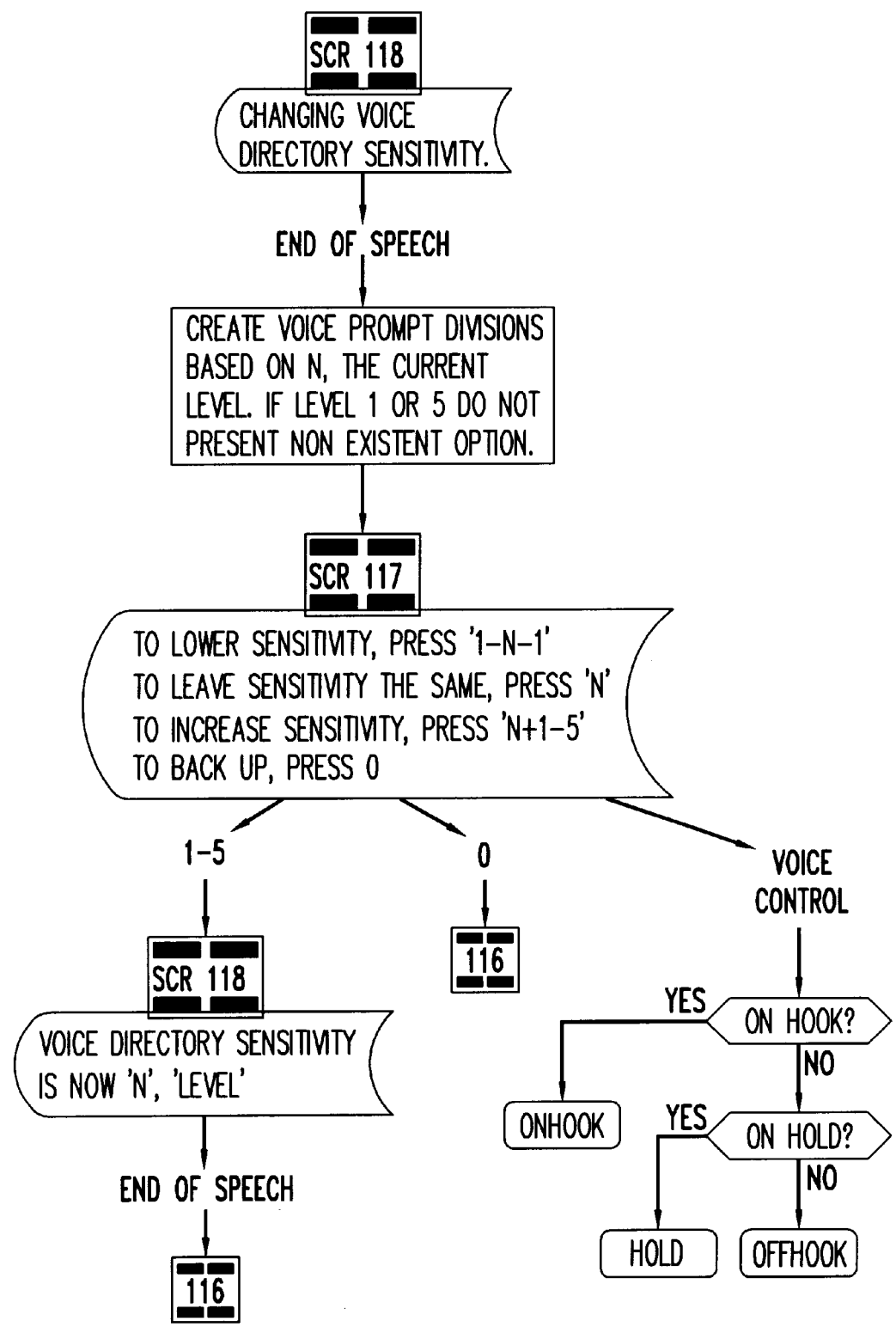

FIGS. 9 and 10 show a voice customizing training procedure for customizing the sensitivities or levels of recognition that is applied to specific commands. Such training procedure describes a multiple threshold criteria process which permits a similarity metric, corresponding to a most closely matching model of speech, to be compared to a set of thresholds for a selected set of criteria Through this procedure, each one of the users of the telephone device 10, shown in FIG. 12 may select a specific level of recognition to be applied to a specific command. Five specific levels of recognition are provided, "very low", "low", "medium", "high", or "very high", although it is to be understood that either fewer or more levels may be provided. A user may select these levels either for customization of the voice command thresholds or the voice directory thresholds.

To enter the training procedure, a user presses a voice button 71 on the telephone device 10 and selects customizing in the display 72 or from a voice menu. As shown in FIG. 9, either one of users 1 through 4 is selected and the commands are customized according to the wishes of the selected user. By following the procedure set forth in FIGS. 9 and 10, the user may change the level, i.e., the sensitivity or level of recognition that is applied for a specific command to suit the wishes of the user. This is applicable for each user of the voice recognition telephone.

The user also may customize the sensitivity or level of recognition for the voice directory. This procedure is selected in the flow chart shown in FIG. 9 and detailed in the flow chart shown in FIG. 11. Each user may change the sensitivity for the level of all the names that he or she has entered into the directory for later voice recognition for dialing.

From the foregoing, it should be readily ascertained that the invention is not limited by the embodiments described above which are presented as examples only but may be modified in various ways within the intended scope of protection as defined by the appended patent claims.

What is claimed is:

1. A speech recognizer apparatus for recognizing a phrase including at least one word, based upon an utterance, the apparatus comprising:

a plurality of stored recognition criteria sets, each stored recognition criteria set having at least one class of recognition criteria, each stored class being associated with a corresponding probability of recognition for a given utterance;

a selection module responsive to a user, wherein said user selects a selected recognition criteria set from said plurality of stored recognition criteria sets;

a comparator module, responsive to the selection module, for determining whether a similarity metric corresponding to a most closely matching model of speech satisfies the selected recognition criteria set; and a recognizer module for recognizing the utterance as the phrase corresponding to said most closely matching model of speech when the selected recognition criteria set is satisfied.

2. The apparatus of claim 1, wherein a model of speech comprises one or more predetermined words.

3. The apparatus of claim 2, wherein a predetermined word comprises a command word for a utilization device.

4. The apparatus of claim 3, wherein said selection is further responsive to said plurality of users wherein each of said users selects a selected recognition criteria set from said plurality of stored recognition criteria sets on a per command word basis.

5. The apparatus of claim 4, wherein said selection is further response to said plurality of users wherein each of said user selects a selected recognition criteria set from said plurality of stored recognition criteria sets on a per command word family basis.

6. The apparatus of claim 2, further including a utilization device for incorporating said speech recognizer apparatus.

7. The apparatus of claim 6, wherein the utilization device is a telephone.

8. The apparatus of claim 7, wherein the utilization device is a wireless telephone.

9. The apparatus of claim 6, wherein the utilization device is an answering machine.

10. The apparatus of claim 2, wherein each recognition criteria set comprises a set of thresholds and wherein the comparator module is operative to compare the similarity metric corresponding to said most closely matching model of speech to a set of thresholds for said selected recognition criteria set.

11. The apparatus of claim 10, wherein said stored recognition criteria sets includes a default class optimized for an average user in normal conditions, at least one class having a probability of recognition greater than said default class, and at least one class having a probability of recognition less than said default class.

12. The apparatus of claim 1, wherein said selection module is responsive to a plurality of users wherein each of said users selects a selected recognition criteria set from said plurality of stored recognition criteria sets on a per user basis.

13. The apparatus of claim 12, wherein said selection module is further responsive to said plurality of users wherein each of said users selects a selected recognition criteria set from said plurality of stored recognition criteria sets on a per utterance basis.

14. A telecommunications instrument, comprising:
 a microphone; and
 a speech recognizer for recognizing a phrase including at least one word, based upon a utterance, the speech recognizer including
 a plurality of stored recognition criteria sets, each stored criteria set having at least one class of recognition criteria, each stored class being associated with a corresponding probability of recognition for a given utterance;
 a selection module response to a user, wherein said user selects a selected recognition criteria set from said plurality of stored recognition criteria sets;
 a comparator module, responsive to the selecting module, for determining whether a similarity metric corresponding to a most closely matching model of speech satisfies the selected recognition criteria set; and
 a device control circuit responsive to recognition of an utterance by said speech recognizer.

15. The telecommunications instrument of claim 14, wherein said device control circuit is a telephone circuit for providing telephone operation in response to recognition of an utterance.

16. The telecommunications instrument of claim 15, further comprising:
 a radio transceiver; and
 an audio processor for interfacing the microphone and the telephone circuit to the transceiver, the audio processor being responsive to control signals provided by the telephone circuit.

17. The telecommunications instrument of claim 14, wherein said device control circuit is answering machine circuit for audibly reproducing stored messages in response to recognition of an utterance.

18. The telecommunications instrument of claim 17, wherein the microphone is a hands-free microphone.

19. The telecommunications instrument of claim 17, wherein the microphone is a handset microphone of a cordless telephone.

20. The telecommunications instrument of claim 14, further comprising a radio transceiver coupled to said device control circuit to provide wireless telephone communication.

21. The telecommunications instrument of claim 14, wherein the microphone is a hands-free microphone.

22. A method of recognizing a phrase including at least one word, based upon an utterance, the method comprising the steps of
 comparing the utterance to one or more speech models to determine a similarity metric for each such comparison;
 determining, in a first determining step, which model of speech most closely matches the utterance based on the one or more similarity metrics obtained during said comparing step;
 selecting, by a user, at least one recognition criteria set from a plurality of stored recognition criteria sets each stored criteria set having at least one class of recognition criteria, each stored class being associated with a corresponding probability of recognition for a given utterance;
 determining, in a second determining step, whether the similarity metric corresponding to the most closely matching model of speech satisfies the selected recognition criteria set; and
 recognizing the utterance as the phrase corresponding to said most closely matching model of speech when the selected recognition criteria set is satisfied.

* * * * *